US010412371B1

(12) United States Patent
Chao et al.

(10) Patent No.: US 10,412,371 B1
(45) Date of Patent: *Sep. 10, 2019

(54) THIN FILM ACOUSTO-OPTIC STRUCTURED LIGHT GENERATOR

(71) Applicant: Facebook Technologies, LLC, Menlo Park, CA (US)

(72) Inventors: Qing Chao, Redmond, WA (US); Michael Hall, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 232 days.

This patent is subject to a terminal disclaimer.

(21) Appl. No.: 15/599,353

(22) Filed: May 18, 2017

(51) Int. Cl.
*H04N 13/254* (2018.01)
*G06T 7/521* (2017.01)
*G02F 1/11* (2006.01)
*H04N 13/229* (2018.01)
*H04N 13/296* (2018.01)

(52) U.S. Cl.
CPC .......... *H04N 13/254* (2018.05); *G02F 1/113* (2013.01); *G06T 7/521* (2017.01); *H04N 13/229* (2018.05); *H04N 13/296* (2018.05); *G06T 2207/10028* (2013.01)

(58) Field of Classification Search
CPC .......... G02F 1/113; G06T 2207/10028; G06T 7/521; H04N 13/254; H04N 13/229; H04N 13/296
See application file for complete search history.

(56) References Cited

U.S. PATENT DOCUMENTS 10,181,200 B1 * 1/2019 Chao ................ G06T 7/521

* cited by examiner

*Primary Examiner* — Huy T Nguyen
(74) *Attorney, Agent, or Firm* — Fenwick & West LLP

(57) ABSTRACT

A depth camera assembly (DCA) includes a structured light generator, an imaging device and a controller. The structured light generator illuminates a local area with one or more structured light patterns in accordance with emission instructions from the controller. The structured light generator comprises an illumination source, thin film acousto-optic device(s), and a projection assembly. The thin film acousto-optic device(s) generate a structured light pattern from optical beam(s) emitted from the illumination source. The projection assembly projects the structured light pattern(s) into the local area. The imaging device captures portions of the one or more structured light patterns scattered or reflected from the local area. The controller determines depth information for the local area based at least in part on the captured portions of the one or more scattered or reflected structured light patterns.

20 Claims, 8 Drawing Sheets

500

```
┌─────────────────────────────────────────────────────────────────────┐
│ Generate a structured light pattern from an optical beam using a    │
│ dynamic diffraction grating to form the structured light pattern    │
│ based in part on emission instructions                              │
│                              510                                    │
└─────────────────────────────────────────────────────────────────────┘
                                 ↓
┌─────────────────────────────────────────────────────────────────────┐
│           Project the structured light pattern into a local area    │
│                              520                                    │
└─────────────────────────────────────────────────────────────────────┘
                                 ↓
┌─────────────────────────────────────────────────────────────────────┐
│ Capture portions of the structured light pattern scattered or       │
│ reflected from one or more objects in the local area                │
│                              530                                    │
└─────────────────────────────────────────────────────────────────────┘
                                 ↓
┌─────────────────────────────────────────────────────────────────────┐
│ Determine local depth information for the one or more objects based │
│ on information of the captured portions of the scattered or         │
│ reflected structured light pattern                                  │
│                              540                                    │
└─────────────────────────────────────────────────────────────────────┘
```

FIG. 5

THIN FILM ACOUSTO-OPTIC STRUCTURED LIGHT GENERATOR

BACKGROUND

The present disclosure relates generally to depth sensing, and specifically relates to an acousto-optic structured light generator in a depth camera assembly.

Augmented reality (AR), virtual reality (VR), and 3D depth sensing systems are becoming ever more widely adopted. A challenge faced by VR and AR developers is making the technology more compact and flexible. One way this can be done is by modifying the illumination system of the device. Conventional illuminators require a sufficient amount of space to transform the wavefront emitted by a light source into the light that images a scene and senses depth. This space contains a plurality of optical elements which can cause stability problems and alignment difficulties.

SUMMARY

A depth camera assembly (DCA) determines depth information associated with one or more objects in a local area. The DCA comprises a structured light generator, an imaging device, and a controller. The structured light generator is configured to illuminate a local area with structured light in accordance with emission instructions. The structured light generator comprises an illumination source, an acousto-optic device, and a projection assembly. The illumination source is configured to emit an optical beam. The acousto-optic device(s) function as a dynamic diffraction grating(s) that diffracts the optical beam to form a structured light pattern. The projection assembly projects the structured light pattern into the local area. The imaging device is configured to capture portions of the one or more structured light patterns scattered or reflected from one or more objects in the local area. The controller may be coupled to both the structured light generator and the imaging device. The controller generates the emission instructions and provides the emission instructions to the structured light generator. The controller is also configured to determine depth information for the one or more objects based on information of the captured portions of the one or more scattered or reflected structured light patterns.

Embodiments of the present disclosure further support a head-mounted display (HMD) that integrates the DCA. The HMD further includes an electronic display and an optical assembly. The HMD may be, e.g., a virtual reality (VR) system, an augmented reality (AR) system, a mixed reality (MR) system, or some combination thereof. The electronic display is configured to emit image light. The optical assembly is configured to direct the image light to an exit pupil of the HMD corresponding to a location of a user's eye, the image light comprising the depth information of the one or more objects in the local area determined by the DCA.

BRIEF DESCRIPTION OF THE DRAWINGS

FIG. 5 is a flow chart illustrating a process of determining depth information of objects in a local area based on one or more structured light patterns, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A depth camera assembly (DCA) for determining depth information of objects in a local area surrounding some or all of the DCA. The DCA includes a structured light generator, a camera and a controller. The structured light generator includes an acousto-optic device that is configured to generate a structured light pattern that is projected into the local area. The camera captures one or more images of portions of the structured light scattered or reflected from the objects in the local area. The controller determines depth information using the one or more images.

In some embodiments, the DCA is integrated into a head-mounted display (HMD) that captures data describing depth information in a local area surrounding some or all of the HMD. The HMD may be part of, e.g., a virtual reality (VR) system, an augmented reality (AR) system, a mixed reality (MR) system, or some combination thereof. The HMD further includes an electronic display and an optical assembly. The electronic display is configured to emit image light. The optical assembly is configured to direct the image light to an exit pupil of the HMD corresponding to a location of a user's eye, the image light comprising the depth information of the objects in the local area determined by the DCA.

Figure 1:
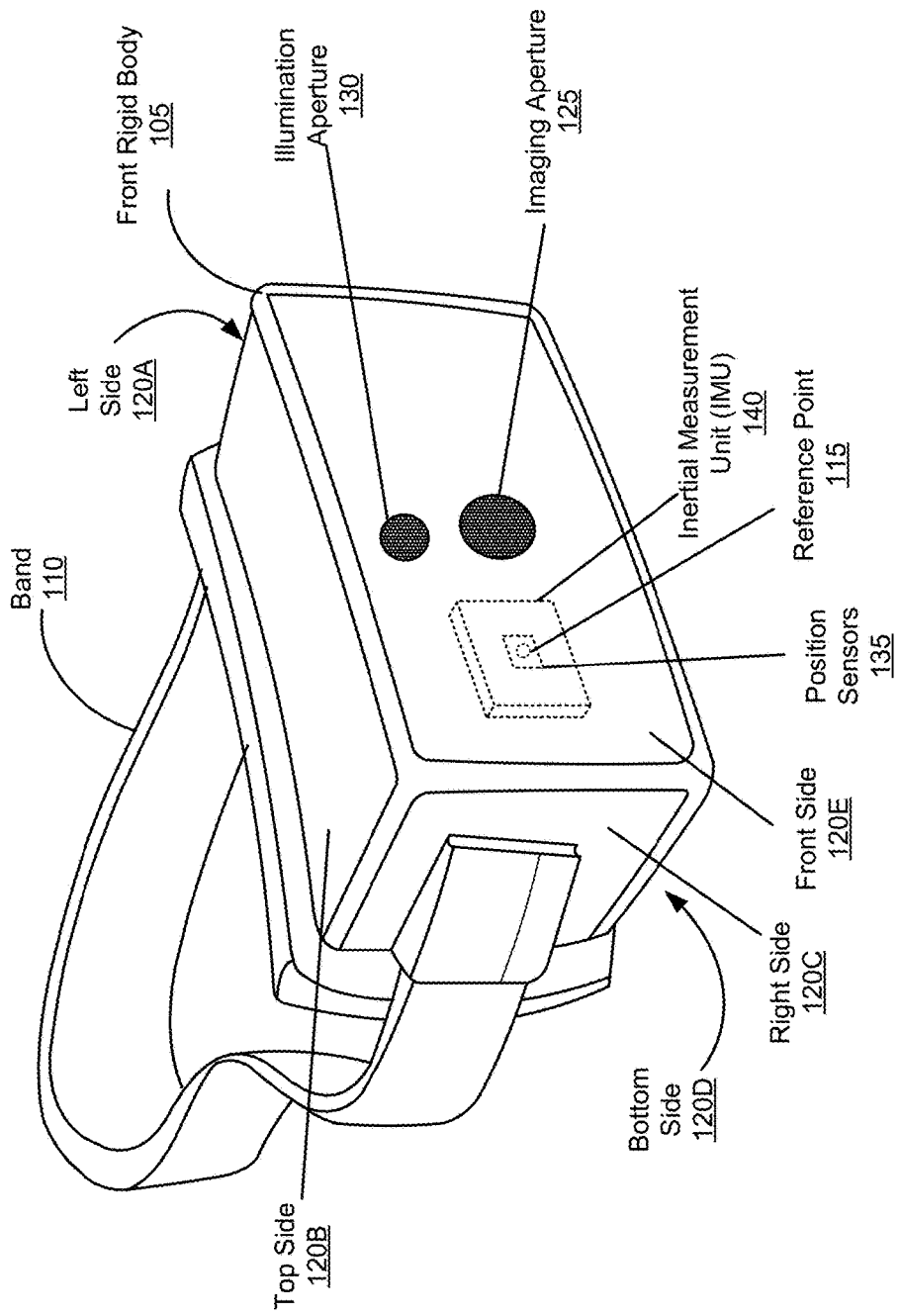
FIG. 1 is a diagram of a head-mounted display (HMD), in accordance with an embodiment.

FIG. 1 is a diagram of a HMD 100, in accordance with an embodiment. The HMD 100 may be part of, e.g., a VR system, an AR system, a MR system, or some combination thereof. In embodiments that describe AR system and/or a MR system, portions of a front side 120E of the HMD 100 are at least partially transparent in the visible band (~380 nm to 750 nm), and portions of the HMD 100 that are between the front side 120E of the HMD 100 and an eye of the user are at least partially transparent (e.g., a partially transparent electronic display). The HMD 100 includes a front rigid body 105, a band 110, and a reference point 115. The HMD 100 also includes a DCA (not shown) configured to determine depth information of a local area surrounding some or all of the HMD 100. The HMD 100 includes an imaging aperture 130 and an illumination aperture 130, and an illumination source of the DCA emits structured light through the illumination aperture 130. And an imaging device of the DCA captures light from the illumination source that is reflected/scattered from the local area through the imaging aperture 125. Light emitted from the illumination source of the DCA through the illumination aperture 130 comprises a structured light pattern, as discussed in more detail in conjunction with FIGS. 2-4. Light reflected/scattered from the local area through the imaging aperture 125 and captured by the imaging device of the DCA comprises portions of the reflected/scattered structured light pattern, as also discussed in more detail in conjunction with FIGS. 2-4.

The front rigid body 105 includes one or more electronic display elements (not shown in FIG. 1), one or more integrated eye tracking systems (not shown in FIG. 1), an Inertial Measurement Unit (IMU) 140, one or more position sensors 135, and the reference point 115. In the embodiment shown by FIG. 1, the position sensors 135 are located within the IMU 140, and neither the IMU 140 nor the position sensors 135 are visible to a user of the HMD 100. The IMU 140 is an electronic device that generates fast calibration data based on measurement signals received from one or more of the position sensors 135. A position sensor 135 generates one or more measurement signals in response to motion of the HMD 100. Examples of position sensors 135 include: one or more accelerometers, one or more gyroscopes, one or more magnetometers, another suitable type of sensor that detects motion, a type of sensor used for error correction of the IMU 140, or some combination thereof. The position sensors 135 may be located external to the IMU 140, internal to the IMU 140, or some combination thereof.

Figure 2:
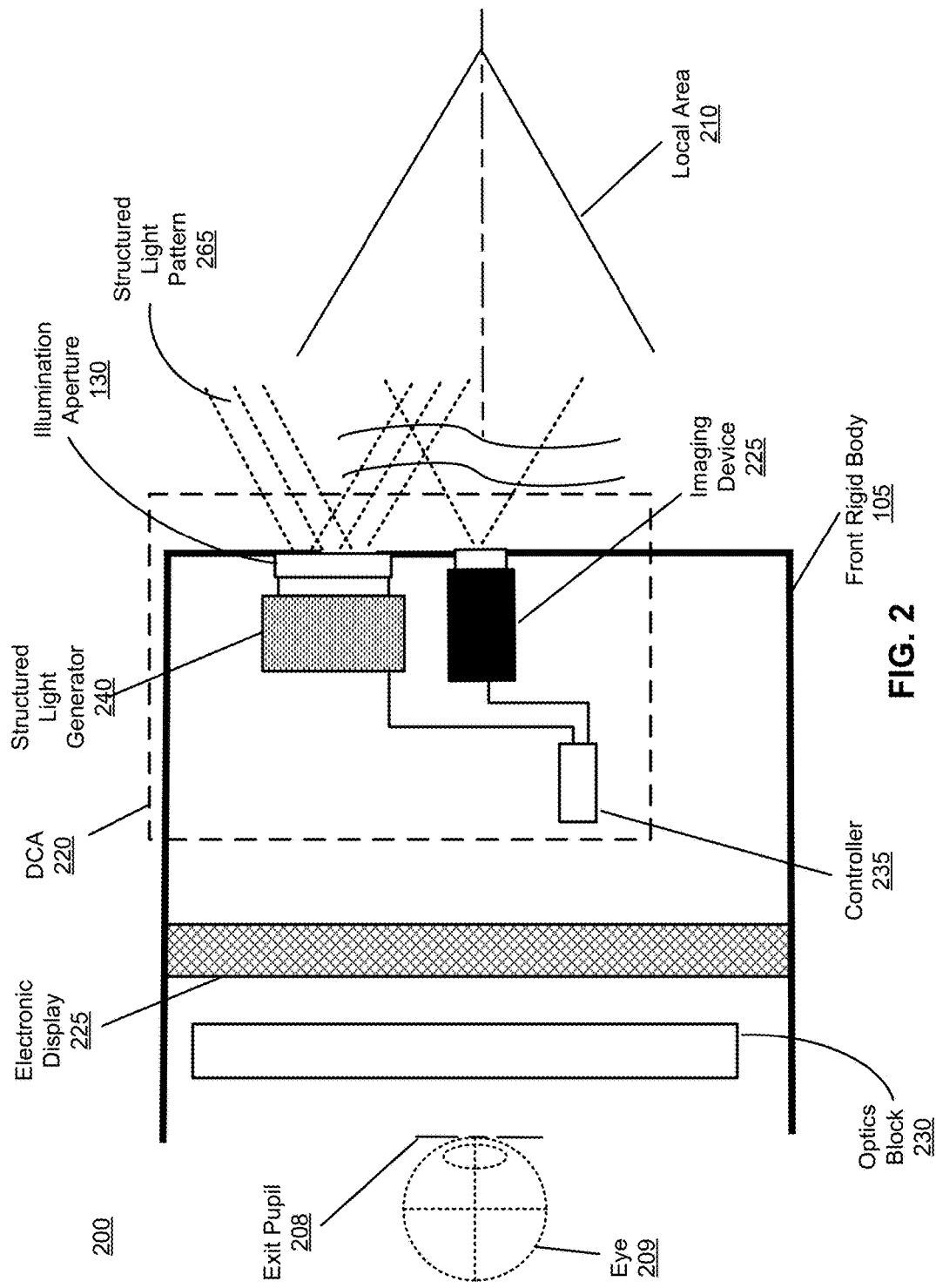
FIG. 2 is a cross section of a front rigid body of the HMD in FIG. 1, in accordance with an embodiment.

FIG. 2 is a cross section 200 of the front rigid body 105 of the HMD 100 shown in FIG. 1. As shown in FIG. 2, the front rigid body 105 includes an electronic display 225 and an optics block 230 that together provide image light to an exit pupil 208. The exit pupil 208 is the location of the front rigid body 105 where a user's eye 209 is positioned. For purposes of illustration, FIG. 2 shows a cross section 200 associated with a single eye 209, but another optics block 230, separate from the optics block 230, provides altered image light to another eye of the user. The front rigid body 105 also has an optical axis corresponding to a path along which image light propagates through the front rigid body 105.

The electronic display 210 generates image light. In some embodiments, the electronic display 210 includes an optical element that adjusts the focus of the generated image light. The electronic display 210 displays images to the user in accordance with data received from a console (not shown in FIG. 2). In various embodiments, the electronic display 210 may comprise a single electronic display or multiple electronic displays (e.g., a display for each eye of a user). Examples of the electronic display 210 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The electronic display 210 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display. In some embodiments, one or more of the display block optical elements may have one or more coatings, such as anti-reflective coatings.

The optics block 230 magnifies received light from the electronic display 210, corrects optical aberrations associated with the image light, and the corrected image light is presented to a user of the HMD 100. At least one optical element of the optics block 230 may be an aperture, a Fresnel lens, a refractive lens, a reflective surface, a diffractive element, a waveguide, a filter, or any other suitable optical element that affects the image light emitted from the electronic display 210. Moreover, the optics block 230 may include combinations of different optical elements. In some embodiments, one or more of the optical elements in the optics block 230 may have one or more coatings, such as anti-reflective coatings, dichroic coatings, etc. Magnification of the image light by the optics block 230 allows elements of the electronic display 210 to be physically smaller, weigh less, and consume less power than larger displays. Additionally, magnification may increase a field-of-view of the displayed media. For example, the field-of-view of the displayed media is such that the displayed media is presented using almost all (e.g., 110 degrees diagonal), and in some cases all, of the user's field-of-view. In some embodiments, the optics block 230 is designed so its effective focal length is larger than the spacing to the electronic display 210, which magnifies the image light projected by the electronic display 210. Additionally, in some embodiments, the amount of magnification may be adjusted by adding or removing optical elements.

As shown in FIG. 2, the front rigid body 105 further includes a DCA 220 for determining depth information of one or more objects in a local area 245 surrounding some or all of the HMD 100. The DCA 220 includes a structured light generator 240, an imaging device 225, and a controller 235 that may be coupled to both the structured light generator 250 and the imaging device 255. The structured light generator 240 emits light through the illumination aperture 130. In accordance with embodiments of the present disclosure, the structured light generator 240 is configured to illuminate the local area 210 with one or more structured light patterns 265 in accordance with emission instructions generated by the controller 235. The controller 235 may control operation of certain components of the structured light generator 240, based on the emission instructions. In some embodiments, the controller 235 may provide the emission instructions to a diffractive optical element of the structured light generator 240 to control a field-of-view of the local area 265 illuminated by the one or more structured light patterns 265. More details about controlling the diffractive optical element of the structured light generator 240 by the controller 235 are disclosed in conjunction with FIG. 3.

The structured light generator 240 generates structured light and projects the structured light into the local area 210. The structured light generator 240 comprises an one or more illumination sources, one or more acousto-optic devices, and one or more projection assemblies. An illumination source is configured to emit light (e.g., as an optical beam), and may emit multiple wavelengths of light. The illumination source may emit light in, e.g., a visible band (~380 nm to 750 nm), in an infrared (IR) band (~750 nm to 1,800 nm), in an ultraviolet band (~100 nm to 380 nm), some other portion of the electromagnetic spectrum that the imaging device 225 is configured to detect, or some combination thereof. An illumination source may be, e.g., a laser diode (e.g., edge emitters), an inorganic or organic LED, a vertical-cavity surface-emitting laser (VCSEL), or some other source. In some embodiments, a single emitter or a plurality of emitters in the structured light generator can emit light having a structured light pattern. Light emitted from the one or more of the illumination sources may be, e.g., polarized (e.g., linear, circular, etc.).

The acousto-optic device generates a structured light pattern using light (e.g., an optical beam) from the illumination source. The acousto-optic device diffracts the emitted optical beam to form the structured light pattern. In one embodiment, the acousto-optic device is comprised of an interdigital transducers deposited on the surface of a transparent optically anisotropic waveguide. The waveguide may, for example, have a sub-millimeter thickness. In some embodiments, of the waveguide is made of lithium niobate crystal (LiNbO$_3$). The optical waveguide layer is deposited on another transparent substrate layer (e.g. LiNbO$_3$). The acousto-optic device includes a diffractive area upon which the emitted optical beam is incident. In some embodiments, depending on the optical waveguide and substrate design, this diffractive area is reflective, meaning that the incident light is reflected off of this diffractive surface to form the structured light pattern. In other embodiments, the diffractive area is transmissive, meaning that the incident light is transmitted through the diffractive area of the acousto-optic device and emerges from the acousto-optic device as the diffracted structured light pattern. In this embodiment, the optical beam is diffracted through the anisotropic optical waveguide through mode coupling, which means the optical wave propagates in the opposite direction of the acoustic wave. In this geometry, the mode switches from TE to TM mode through the collinear geometry in the momentum space (illustrated in the k-space diagram). In one embodiment, the acousto-optic device is connected to an electric circuit which supplies it with emission instructions from the controller. This information changes the frequency at which the acousto-optic device is driven, changing the angle at which the diffracted optical beams are projected.

In one embodiment, the acoustic transducer is composed of an array of interdigital elements to diffract multiple collimated optical beams simultaneously. In another embodiment, the acoustic transducer is a single interdigital element that diffracts a single optical beam into multiple diffraction orders for phase-shifted depth sensing. In this embodiment, the two diffracted optical beams interfere and generate a series of smooth traveling sinusoidal patterns which are projected into the object space. The spatial frequencies of the sinusoidal pattern are controlled by changing the RF frequencies that drive the transducer. Each sinusoidal structured light pattern is phase shifted through a few discrete steps of phase. The phase shifted depth sensing is achieved by measuring the phase shifted patterns. The RF frequency and phase shift signals are generated from the controller. Furthermore, the surface propagating acoustic waves are excited by a set of interdigital electrode transducers. Each of these transducers comprises an array of thin film metal electrodes deposited on a smooth surface using integrated circuit photolithography methods. A voltage is applied to the electrodes and the excited electric fields periodically excite acoustic waves through the piezoelectric effect if the electrode spacing is approximately equal to half of the acoustic wavelength. Hence, the electrode spacing and overlap determine the properties of the transducer.

The projection assembly projects structured light into the local area 210. The projection assembly comprises one or more optical elements that direct the structured light pattern into the local area 210. For example, the projection assembly could comprise a plurality of lenses.

The imaging device 225 captures, through the imaging aperture 120, portions of the one or more structured light patterns 265 scattered or reflected from the local area 210. The imaging device 225 is a camera that captures one or more images of one or more objects in the local area 245 illuminated with the one or more structured light patterns 265.

The controller 235 controls the structured light generator 240 and the imaging device 225. The controller 235 provides the structured light generator 240 emission instructions. Emission instructions are instructions that control operation of the DCA 220. Emission instructions may control, e.g., the one or more sources (e.g., beam intensity, modulation of the optical beam, wavelength of the optical beam, duration of the one or more optical beams, one or more optical elements in a projection assembly, or some combination thereof), radio frequency (RF) information, the imaging device (e.g., shutter, ISO, aperture, focus, other properties of the imaging device 225, or some combination thereof), or some combination thereof. RF information describes radio frequency information that may be used to drive transducers in one or more of the acousto-optic devices. RF information may include, e.g., a RF frequency, a range of RF frequencies, a RF amplitude, a RF modulation, or some combination thereof. A RF modulation describes how the RF frequency output by a transducer is to change with time (e.g., sweep across a range of RF frequencies v. skip between discrete frequencies).

As discussed in detail below, the controller 235 determines depth information of one or more objects in the local area imaged by the imaging device 225. The controller 235 provides the determined depth information to a console (not shown in FIG. 2) and/or an appropriate module of the HMD 100 (e.g., a varifocal module, not shown in FIG. 2). The console and/or the HMD 100 may utilize the depth information to, e.g., generate content for presentation on the electronic display 210.

In some embodiments, the front rigid body 105 further comprises an eye tracking system (not shown in FIG. 2) that determines eye tracking information for the user's eye 230. The eye tracking system includes one or more cameras configured to image one or both eyes of the user. In some embodiments, the eye tracking system also includes one or more illumination sources, that are configured to illuminate the eye. In some embodiments, the one or more light sources emit structured light. The eye tracking system can use locations of the reflected light in a captured image to determine eye position and eye-gaze, or other known techniques to determine eye tracking information. Eye tracking information describes a position and orientation of a user's eye. Eye tracking information may include, e.g., a position of one or both eyes, an orientation of one or both eyes, a gaze angle of one or both eyes, a predicted focal plane for one or both eyes, inter-pupillary distance between the eyes, or some combination thereof. The determined eye tracking information may comprise information about an orientation of the user's eye 209 in an eye-box, i.e., information about an angle of an eye-gaze. An eye-box represents a three-dimensional volume at an output of a HMD in which the user's eye is located to receive image light.

In some embodiments, the front rigid body 105 further comprises a varifocal module (not shown in FIG. 2). The varifocal module may adjust focus of one or more images displayed on the electronic display 210, based on the eye tracking information. In one embodiment, the varifocal module adjusts focus of the displayed images and mitigates vergence-accommodation conflict by adjusting a focal distance of the optics block 230 based on the determined eye tracking information. In another embodiment, the varifocal module adjusts focus of the displayed images by performing foveated rendering of the one or more images based on the determined eye tracking information. In yet another embodiment, the varifocal module utilizes the depth information from the controller 260 to generate content for presentation on the electronic display 210.

Figure 3:
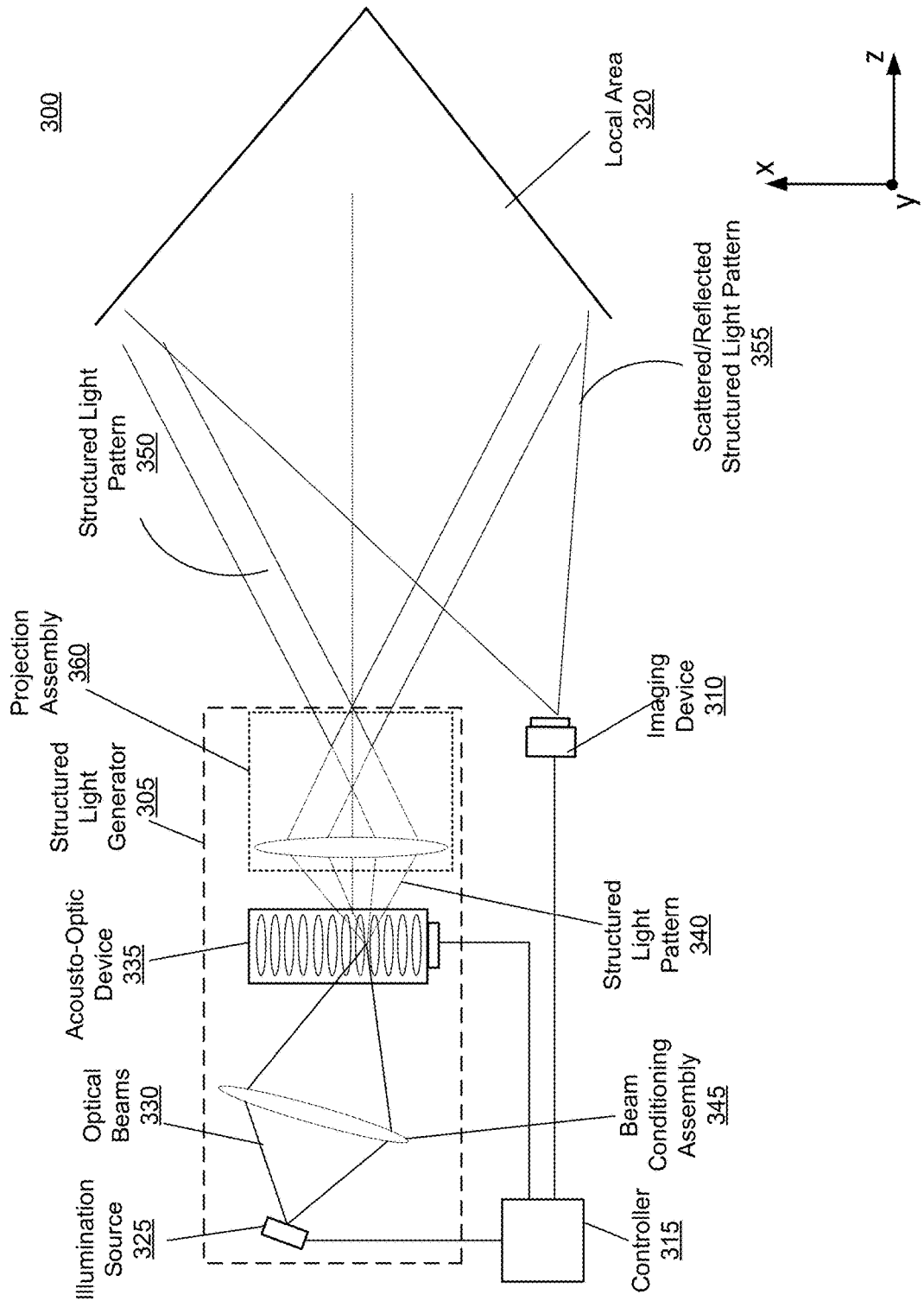
FIG. 3 is an example depth camera assembly (DCA), in accordance with an embodiment.

FIG. 3 is an example DCA 300 configured for depth sensing based a structured light pattern, in accordance with an embodiment. The DCA 300 includes a structured light generator 305, an imaging device 310, and a controller 315 coupled to both the structured light generator 305 and the imaging device 310. The DCA 300 may be configured to be a component of the HMD 100 in FIG. 1. Thus, the DCA 300 may be an embodiment of the DCA 240 in FIG. 2; the structured light generator 305 may be an embodiment of the structured light generator 250 in FIG. 2; and the imaging device 310 may be an embodiment of the imaging device 255 in FIG. 2. FIG. 3 describes a bulk acousto-optic device embodiment. Another embodiment comprises a thin film acousto-optic device. Some embodiments of the DCA 300 have different components than those described here. Similarly, in some cases, functions can be distributed among the components in a different manner than is described here.

The structured light generator 305 is configured to illuminate a local area 320 with one or more structured light patterns in accordance with emission instructions from the controller 315. The structured light generator 305 includes an illumination source 325 (e.g., laser diode) configured to emit one or more optical beams 330.

A beam conditioning assembly 345 directs the one or more optical beams 330 toward a portion of an acousto-optic device 335. The beam conditioning assembly 345 is composed of one or more optical elements (lenses). In the interdigital transducer array embodiment described above, the beam conditioning assembly 345 includes a microlens arrays to couple optical beams to the gratings generated by the surface propagating acoustic waves launched from the transducer array. In the single interdigital transducer embodiment, 345 includes a single lens to couple the optical beam to the grating area.

The acousto-optic device 335 generates one or more structured light patterns 340 by diffracting the one or more optical beams 330. In some embodiments, the acousto-optic device 335 is a reflective dynamic diffraction grating (e.g., see below with regard to FIG. 4). In alternate embodiments, the acousto-optic device 335 is a transmissive dynamic diffraction grating. A transmissive dynamic diffraction grating diffracts light that transmits through the acousto-optic device 335, whereas a reflective diffraction grating diffracts light that reflects from a surface of the acousto-optic device 335. In some embodiments, the acousto-optic device 335 is configured to function as a dynamic diffraction grating that diffracts the one or more optical beams 330 to form the one or more structured light patterns 340 based in part on emission instructions from the controller 315. The acousto-optic device 335 includes a transducer and a diffraction area (not shown in FIG. 3). Responsive to the RF information in the emission instructions, the transducer of the acousto-optic device 335 generates an acoustic wave in a diffraction area of the acousto-optic device 335 to form a dynamic diffraction grating. As noted above, RF information describes radio frequency information that may be used to drive transducers in one or more of the acousto-optic devices. RF information may include, e.g., a RF frequency, a range of RF frequencies, a RF amplitude, a RF modulation, or some combination thereof. RF modulation describes how the RF frequency output by a transducer is to change with time. RF modulation may include, e.g., a sweep rate across a range of RF frequencies, skip rate between discrete frequencies, dynamically moving to specific frequencies (e.g., to track moving objects in the local area), some other change to the RF frequency as a function of time, or some combination thereof.

RF information (e.g., sent by the controller 315) determines the period of the dynamic diffraction grating in the diffraction area. As discussed in detail below with regard to FIGS. 4A-C, the RF information can be adjusted in to affect how the structured light pattern 350 illuminates the local area 320.

The projection assembly 360 projects the one or more structured light patterns 350 into the local area 320. The projection assembly 360 is positioned to receive the structured light pattern 340 from the acousto-optic device 335 and project the structured light pattern 340 into the local area 320. The projection assembly 360 includes one or more optical elements (lenses, mirrors, scanning mirrors, etc.). In some embodiments, the projection assembly 360 may further dynamically direct (e.g., by adjusting an orientation of a scanning mirror) the one or more structured light patterns 350 to different locations within the local area 320 in accordance with the emission instructions.

The one or more structured light patterns 350 illuminate portions of the local area 320, including one or more objects in the local area 320. One or more scattered or reflected structured light patterns 355 are generated based on reflection/scattering of the scattered light pattern 350 from the one or more objects in the local area 320.

The imaging device 310 captures one or more images of the one or more objects in the local area 320 by capturing the portions of the scattered/reflected structured light patterns 355. The imaging device 310 is configured to capture images in a band of light that includes the light emitted from the illumination source 325. In one embodiment, the imaging device 310 is an infrared (IR) camera configured to capture images in the IR. In another embodiment, the imaging device 310 is configured to capture an image light of a visible spectrum. The imaging device 310 can be configured to operate with a frame rate in the range of kHz to MHz for fast detection of objects in the local area 320.

The controller 315 is configured to control operations of some or all of the components of the DCA 300 in FIG. 3. In some embodiments, the controller 315 provides emission instructions to the illumination source 325 to control intensity of the one or more optical beams 330, modulation of the one or more optical beams 330, a time duration during which the illumination source 325 is activated, etc. The controller 315 may further create the emission instructions which include RF information (e.g., a radio frequency at which the acousto-optic device 335 is driven). The controller 315 may generate the emission instructions based on, e.g., a predetermined list of values for radio frequencies stored in a look-up table of the controller 315, and the radio frequencies correspond to different periods of the dynamic diffraction grating. In some embodiments, the controller 315 computes RF information for driving the acousto-optic device 335 to generate the structured light pattern 350 suitable for detection of stationary object(s) and/or tracking of moving object(s) in the local area 320.

The controller 315 can modify the radio frequency at which the acousto-optic device 335 is driven to adjust a diffraction angle at which the one or more optical beams 330 are diffracted. In this way, the controller 315 can instruct the acousto-optic device 335 to scan a plurality of diffraction angles at which the one or more optical beams 330 are diffracted and interfered to form the structured light pattern 340. A radio frequency at which the acousto-optic device 335 is driven controls a separation of the optical beams 330 diffracted by the acousto-optic device 335. Hence, a spatial frequency of the resulting structured light pattern 340 (and of the structured light pattern 350) depends on the radio frequency at which the acousto-optic device 335 is driven.

The controller 315 is further coupled to the imaging device 310 and determines depth information for the one or more objects in the local area 320 using images captured of the local area 320 including portions of the structured light pattern. For example, in some embodiments, the controller 315 determines depth information by comparing a portion of the structured light pattern in the image to pattern sections in a look up table. Each pattern section describes how the structured light pattern deforms for various distances. The controller 315 can select the pattern section that matches (or is within an error threshold of matching) the portion of the structured light pattern in the image. The controller 315 then associated the distance of the selected pattern section with the portion of the image associated with the portion of the structured light pattern. Alternatively, the controller 315 may utilize a model that describes distance as a function of pattern deformation. The controller 315 can apply the model to the captured image to determine depth information for areas including the structured light pattern.

In alternate embodiments, the controller 315 can determine depth information based on phase shifted illumination information of the captured portions of the one or more scattered/reflected structured light patterns 355. Phase-shifted illumination is described in the preceding description of the structured light generator in FIG. 2. On the side of the structured light generator 305, the controller 315 is configured to provide appropriate instructions to one or more components of the structured light generator 305 to generate at least three phase shifted illumination patterns 350 that illuminate the local area 320. The phase shifted illumination patterns 350 may be generated by sending time delayed radio frequency signals from the controller 315 to the acousto-optic device 335. Each relative time delay may be pre-calculated at the controller 315 to yield a desired phase shift. Hence several phase-shifted illumination patterns 350 may be projected to the object(s) in the local area 320. The imaging device 310 may capture the phase-shifted patterns 355 that are distorted by the shape of the object(s) in the local area 320. Then, the controller 315 may use triangulation calculation to obtain a real time (coarse) depth map. In one embodiment, the imaging device 310 is configured to perform phase measurements of the captured light patterns 355 scattered/reflected from the illuminated local area 320. The controller 315 may then reconstruct a course depth map of the local area 320, based on the phase measurements.

Figure 4A:
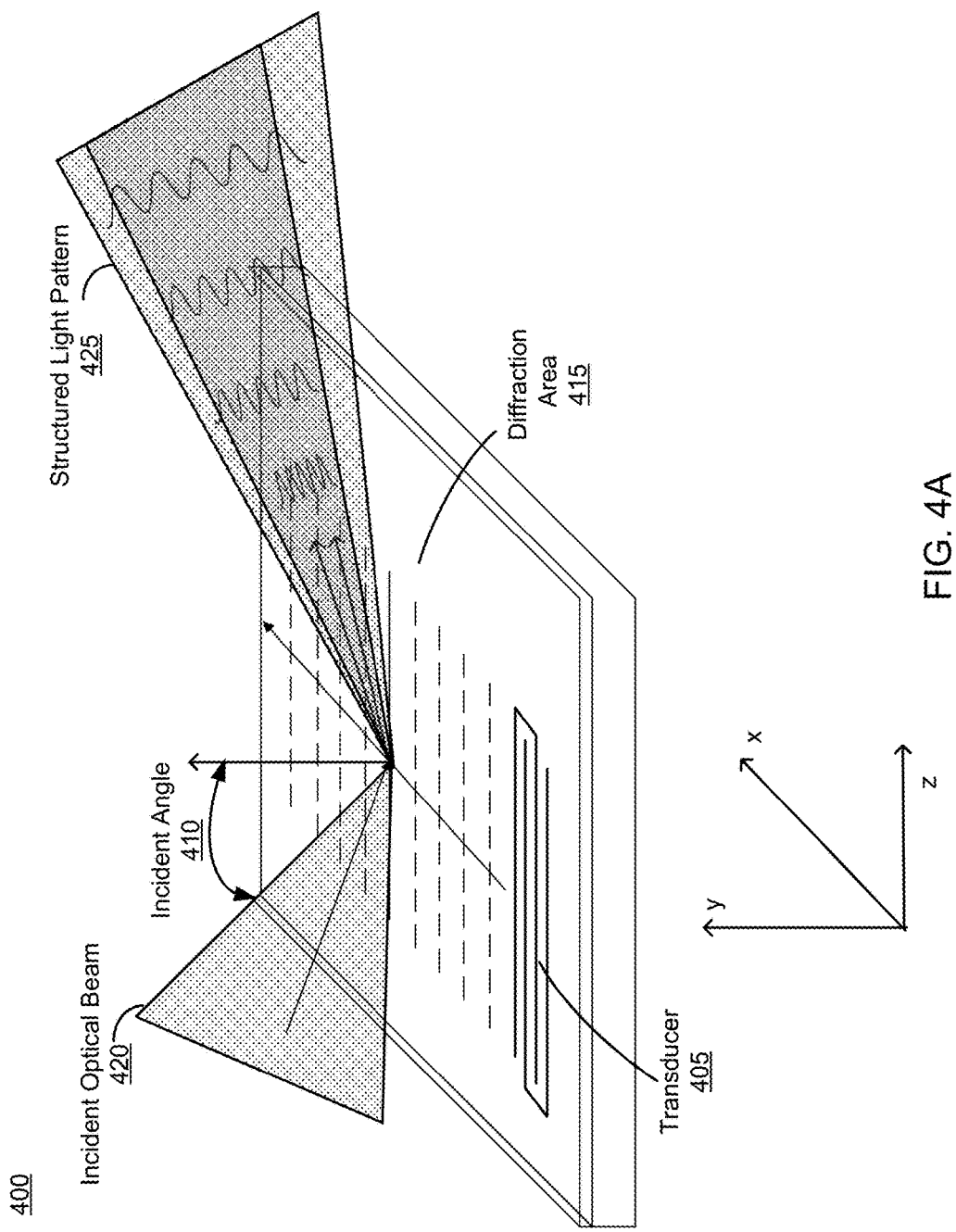
FIG. 4A shows an acousto-optic device diffracting light, according to an embodiment.
Figure 4B:
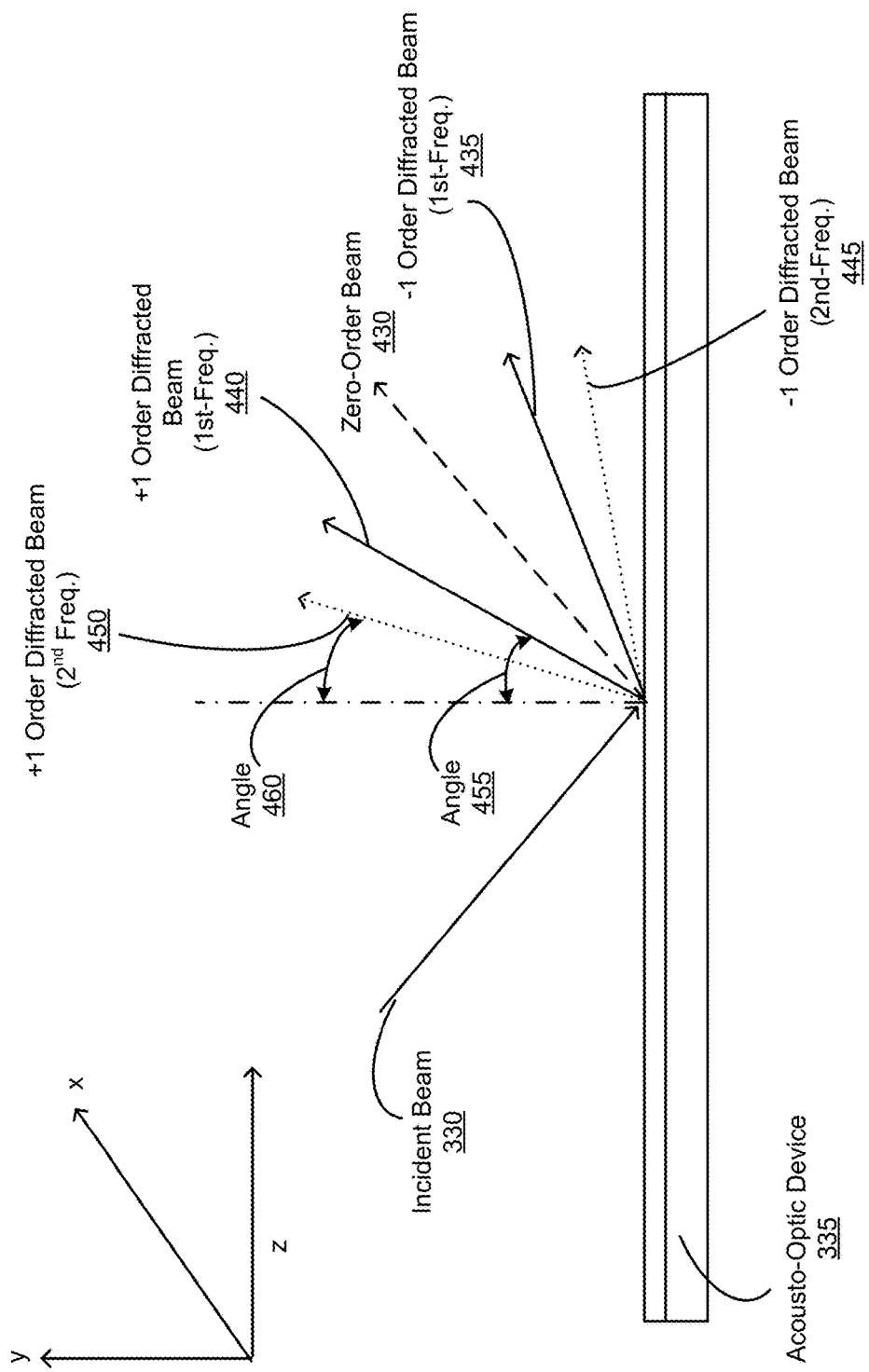
FIG. 4B shows a transducer array embodiment of the acousto-optic device.

FIG. 4A shows an acousto-optic device 400 diffracting light, according to an embodiment. The acousto-optic device 400 may be, e.g., the acousto-optic device 335. In another embodiment, the acousto-optic device is a thin film device. In this embodiment, the acousto-optic device 400 includes a single transducer 405. FIG. 4B shows an embodiment where the acousto-optic device includes an array of transducers. Responsive to an RF signal (e.g., extracted from the RF information), the transducer 405 or transducer array generates a vibration in the acousto-optic device 400 that causes the acousto-optic device 400 to act as a diffraction grating(s). Parameters of the diffraction grating are affected by the RF signal. These parameters can include the period of the grating, the phase of the sinusoidal interferometric patterns in the single transducer embodiment, the spatial frequency of the sinusoidal interferometric pattern in the single transducer embodiment, the deflection angles of the optical beams in the transducer array embodiment, other properties of the grating that could be affected by the RF signal, or some combination thereof.

In some embodiments, the diffracted structured light pattern forms a sinusoidal wave diffraction pattern. In order to maximize the power of the structured light pattern, the diffraction angle of an incident optical beam 420 matches a Bragg angle. In some embodiments, ninety percent of the power contained within the structured light pattern is contained within the zeroth and first orders.

In some embodiments, the acousto-optic device 400 is configured to function as a dynamic diffraction grating that diffracts the incident optical beam 420 to form a structured light pattern 425 based in part on emission instructions from a controller (e.g., the controller 315). Note as discussed in detail below, the structured light pattern 425 includes a plurality of sinusoidally varying diffraction orders. Light is incident at an angle of incidence 410 to a diffraction area 415 of the acousto-optic device 400. The angle of incidence 410 is measured from a vector that is normal to the diffraction area 415. In some embodiments, the angle of incidence 410 of an incident optical beam 420 is matched to a Bragg angle. Matching to the Bragg angle facilitates maximum power transfer from the incident optical beam 420 to a plurality of structured light patterns 425 generated by the acousto-optic device 400. The plurality of structured light pattern 425 are a plurality of sinusoidal wave diffraction patterns of different orders (e.g., $0^{th}$, ±1, ±2, . . . ).

Responsive to the RF signal, the transducer 405 of the acousto-optic device 400 generates an acoustic wave in the diffraction area 415 of the acousto-optic device 400 to form the dynamic diffraction grating. Different frequencies of the RF signal result in different periods of the dynamic grating. Accordingly, a change in frequency correspondingly changes an angle at which the beams are diffracted, allowing the structured light pattern 425 to dynamically be projected into different portions of a local area. When the RF signal's frequency is changed, the diffraction orders of the beams are diffracted at different angles from a normal to the grating (the y-axis as defined in FIG. 4A). For example, a +1 order diffracted beam will be diffracted at a smaller angle from the normal when the RF signal's frequency is increased. The RF signal varies with the information in the RF information provided by the controller. The RF signal may, e.g. sweep across a range of frequencies (e.g., 20 MHz to 100 MHz), skip between discrete frequencies with a band of frequencies, may be adjusted dynamically by a controller, etc. Moreover, as discussed in detail below with regard to FIG. 4C, a change in RF frequency can affect energy distribution between the different diffraction orders of the structured light patterns.

FIG. 4B shows a transducer array embodiment 450 of the acousto-optic device. In this embodiment, a single acousto-optic device contains a plurality of individual interdigital transducers 435 and individual diffraction areas 455. In this figure, individual transducers 435 are arranged in a transducer array 430. The transducer array 430 is deposited on an anisotropic waveguide layer 440. A substrate layer 445. The optical beam 432 is transmitted through the acousto-optic device and becomes the diffracted optical beam 434.

The transducer array embodiment 450 contains many interdigital transducers 435 which deflect light directed towards the acousto-optic device by the beam conditioning assembly 345. In the embodiment of FIG. 4B, the beam conditioning assembly comprises a microlens array, which couples the optical beams 432 sent from the illumination source 325 to the diffraction areas 455 of the transducers 435 in the transducer array 430. In some embodiments, the transducer array 430 contains thousands of individual interdigital transducers 430. A surface propagating acoustic wave is generated in the anisotropic waveguide layer 440. In contrast with the single-transducer embodiment, which operates in reflection mode, in this embodiment, the transducer array 450 operates in transmission mode. Optical beams 432 propagate in the direction opposite to the acoustic wave in the anisotropic waveguide layer 440. They are then diffracted by the surface propagating acoustic wave, deflected, and transmitted through the substrate layer 445 of the structure through mode coupling.

Figure 4C:
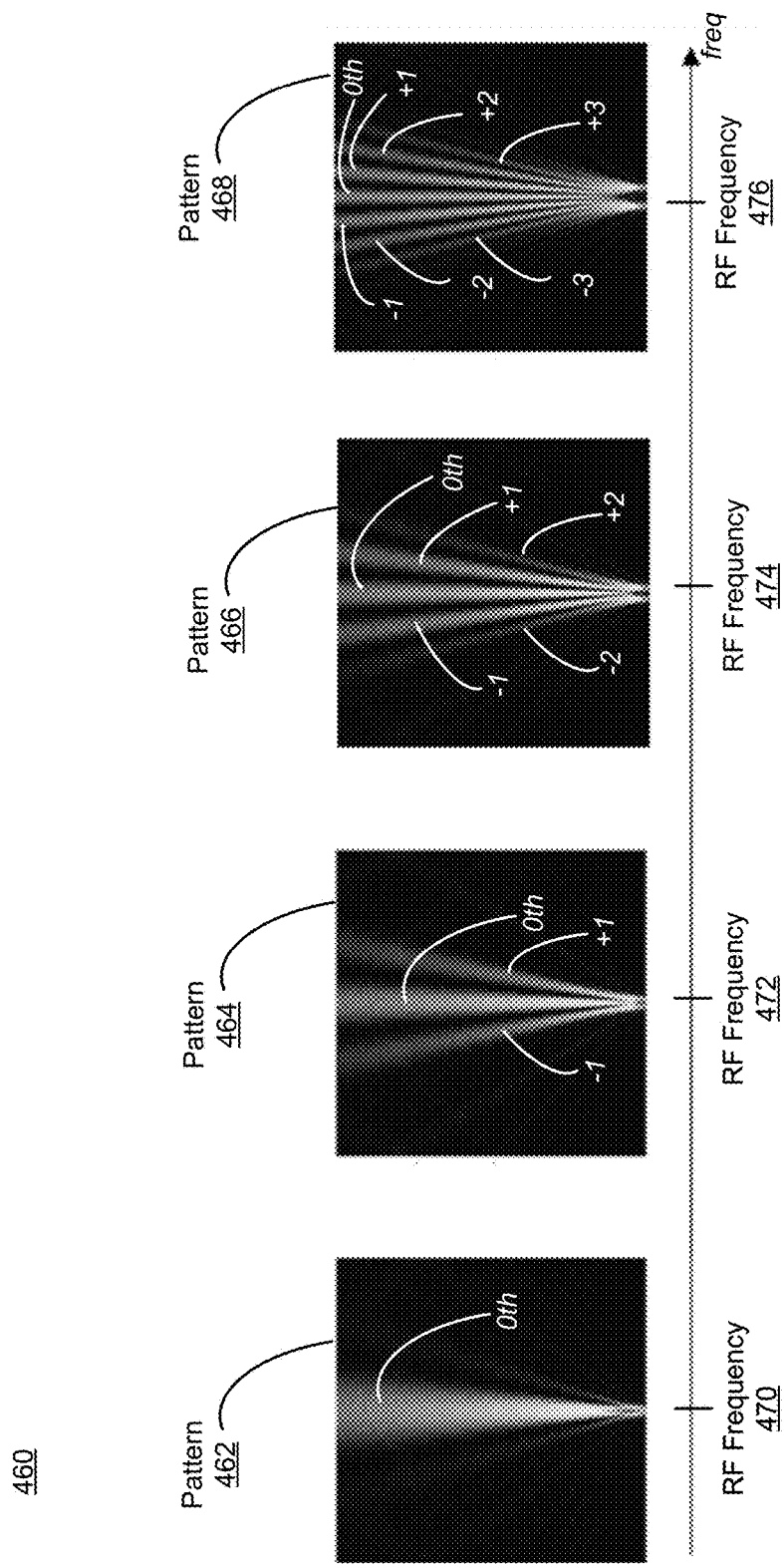
FIG. 4C shows an illustration of interferometric illumination patterns varying with RF frequency, according to an embodiment.

FIG. 4C shows an illustration of interferometric illumination patterns 460 varying with RF frequency, according to an embodiment. In this figure, the interferometric illumination patterns 460 include a pattern 462, 464, 466, and 468 that are respectively generated using an RF frequency 470, an RF frequency 472, an RF frequency 474, and an RF frequency 476. RF frequency 470 is lower than the RF frequency 472, the RF frequency 472 is lower than the RF frequency 474, and the RF frequency 474 is lower than the RF frequency 476.

It is clearly apparent from FIG. 4C that in this embodiment, the RF frequency changes the spatial frequency of the interferometric structured pattern generated by the two first order diffracted optical Gaussian beams from the acousto-optic device. In the Fourier beam propagation simulation in FIG. 4B, as the RF frequency increases, the spatial separation between the first order diffracted beams increase. In 470, one interference fringe 475 is generated when the RF frequency is low. As the frequency increases, more interference fringes 475 are generated. For example, in 472 there are main interference fringes 475, in 474 there are five interference fringes 475, and in 476 there are seven interference fringes 475. Because the pattern has a Gaussian beam profile, the observed decrease in intensity with increasing order resembles a magnitude plot of a Gaussian function . . . .

In the thin film embodiment, the acousto-optic device can be printed on AR glasses. The crystal of the thin film acousto-optic device is transparent in visible wavelengths and is therefore invisible to the eye of the person wearing the device. The glasses can be outfitted with dynamic structured illumination or scanning patterns to improve the effectiveness of the depth scanning technique. Multiple patterns can be used at one time (one for each eye) or serial patterns can be used.

FIG. 5 is a flow chart illustrating a process 500 of determining depth information of objects in a local area based on one or more structured light patterns, in accordance with an embodiment. The process 500 of FIG. 5 may be performed by the components of a DCA (e.g., the DCA 300). Other entities (e.g., a HMD and/or console) may perform some or all of the steps of the process in other embodiments. Likewise, embodiments may include different and/or additional steps, or perform the steps in different orders.

The DCA generates 510 (e.g., via a diffractive optical element) a structured light pattern from the optical beam by diffracting the optical beam using the dynamic diffraction grating to form the structured light pattern, based in part on emission instructions (e.g., generated by a controller of the DCA). In some embodiments, the DCA modifies the radio frequency based on RF information in the emission instructions to adjust a diffraction angle at which the optical beam is diffracted and interfered to form the structured light pattern.

The DCA projects 520 (e.g., via a projection assembly) the structured light pattern into a local area. In some embodiments, the DCA projects 430 the structured light pattern to illuminate a wide field-of-view of the local area for accurate depth scanning. The DCA may also control (e.g., via the controller) a size of the illuminated portion of the local area by controlling the dynamic diffraction grating within the DCA.

The DCA captures 530 (e.g., via an imaging device) portions of the structured light patterns scattered or reflected from one or more objects in the local area. The DCA can capture specific information regarding the objects in the local area for a given driving frequency of the transducer of the acousto-optic device.

The DCA determines 540 (e.g., via the controller) local depth information for the one or more objects based on information of the captured portions of the one or more scattered or reflected structured light patterns. In the transducer array embodiment, several methods are employed to determine depth information depending on the characteristics of the structured light and detection scheme. A first method in this embodiment involves the DCA determining depth information by comparing a portion of the structured light pattern in the image to pattern sections in a look up table. In this case, structured light is generated by scanning the continuous-wave optical beams rapidly (>MHz speed) using the transducer array. If the transducer array contains enough acoustic wave columns, the optical beam scans densely enough to form a direct two-dimensional scan pattern without a second diffracting element. However, to increase the field of view for the illumination pattern, a second element is added to scan the beams in a second dimension. Each pattern section describes how the structured light pattern deforms for various distances. The controller selects the pattern section that matches (or is within an error threshold of matching) the portion of the structured light pattern in the image. The controller then associates the distance of the selected pattern section with the portion of the image associated with the portion of the structured light pattern. The second depth determination method for the transducer array embodiment is suited for the time-of-flight structure light. Instead of a continuous-wave optical beam, a pulsed optical beam is applied. The pulsed optical beam is split by the integrated optical channels and coupled to the microlens array. Following this, it is coupled to the counter-propagating acousto-optic waves generated by the transducer array. Hence, the structured light pattern contains rapidly scanning pulse optical beams. Each of these beams gives an individual time of flight measurement for the depth map. In this case, instead of a 2D array of pixel detectors, a high speed single detector is sufficient to time-gate the back scattered light from the objects. Then a depth map is obtained from the measurements. Lastly, in the single transducer embodiment, the depth map is computed using phase shifted measurements with triangulation using a 2D pixel array detector. Each pixel measures depth information independently. The phase measurements are then unwrapped with an unwrapping algorithm.

Figure 6:
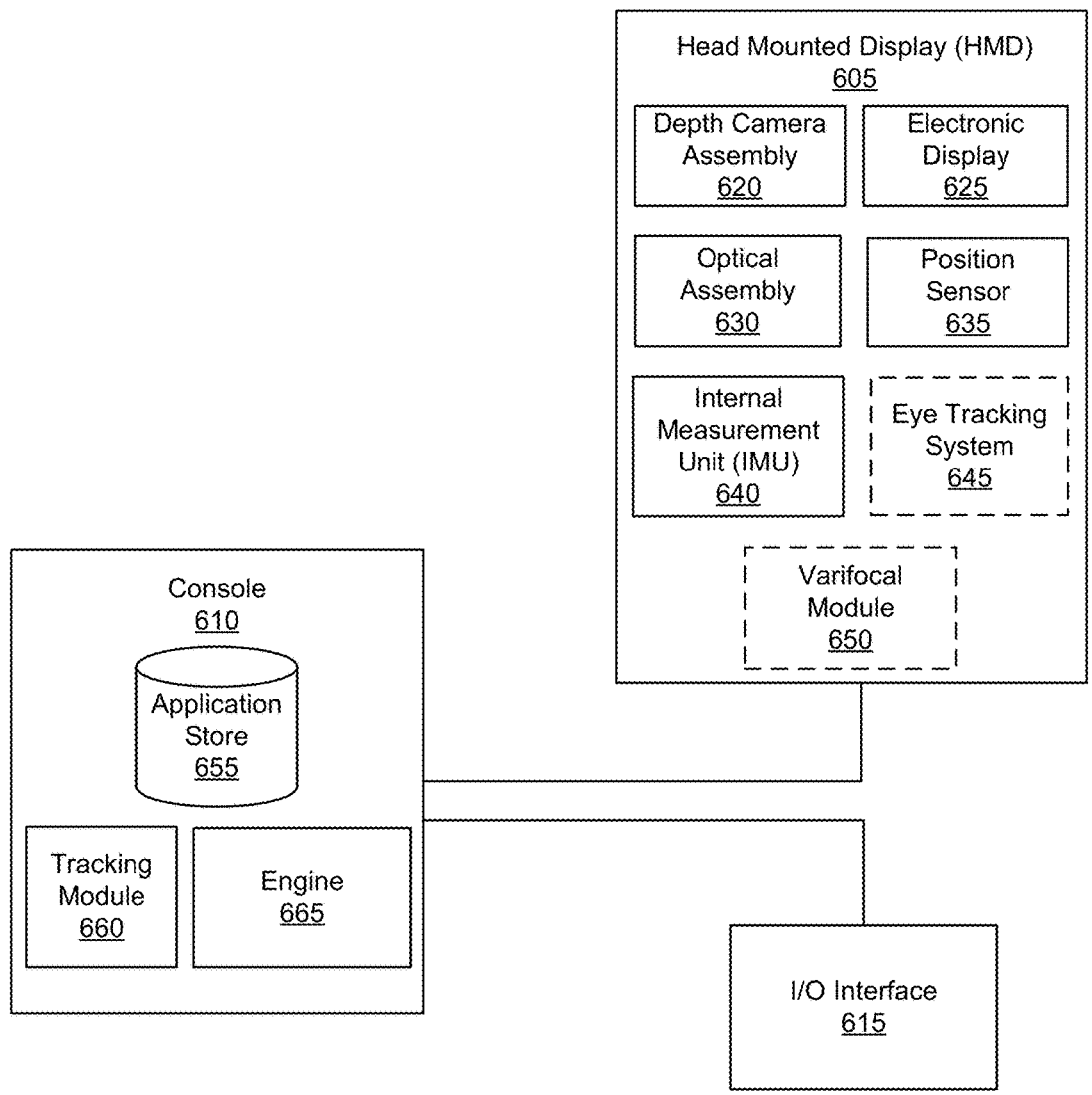
FIG. 6 is a block diagram of a HMD system in which a console operates, in accordance with an embodiment.

FIG. 6 is a block diagram of one embodiment of a HMD system 600 in which a console 610 operates, according to an embodiment. The HMD system 600 may operate in a VR system environment, an AR system environment, a MR system environment, or some combination thereof. The HMD system 600 shown by FIG. 6 comprises a HMD 605 and an input/output (I/O) interface 615 that is coupled to the console 610. While FIG. 6 shows an example HMD system 600 including one HMD 605 and on I/O interface 615, in other embodiments any number of these components may be included in the HMD system 600. For example, there may be multiple HMDs 605 each having an associated I/O interface 615, with each HMD 605 and I/O interface 615 communicating with the console 610. In alternative configurations, different and/or additional components may be included in the HMD system 600. Additionally, functionality described in conjunction with one or more of the components shown in FIG. 6 may be distributed among the components in a different manner than described in conjunction with FIG. 6 in some embodiments. For example, some or all of the functionality of the console 610 is provided by the HMD 605.

The HMD 605 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 605, the console 610, or both, and presents audio data based on the audio information. The HMD 605 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 605 is the HMD 100 described above in conjunction with FIG. 1.

The HMD 605 includes a DCA 620, an electronic display 625, an optical assembly 630, one or more position sensors 635, an IMU 640, an optional eye tracking system 645645, and an optional varifocal module 650. Some embodiments of the HMD 605 have different components than those described in conjunction with FIG. 6. Additionally, the functionality provided by various components described in conjunction with FIG. 6 may be differently distributed among the components of the HMD 605 in other embodiments.

The DCA 620 captures data describing depth information of an area surrounding some or all of the HMD 605. The DCA 620 can compute the depth information using the data (e.g., based on captured portions of one or more scattered structured light patterns), or the DCA 620 can send this information to another device such as the console 610 that can determine the depth information using the data from the DCA 620.

The DCA 620 includes a structured light generator, an imaging device and a controller that may be coupled to both the light generator and the imaging device. The structured light generator of the DCA 620 is configured to illuminate a local area with one or more structured light patterns in accordance with emission instructions from the controller. The structured light generator comprises an illumination source, an acousto-optic device, and a projection assembly. The illumination source is configured to emit an optical beam. The acousto-optic device generates a structured light pattern from the optical beam, wherein the acousto-optic device is configured to function as a dynamic diffraction grating that diffracts the optical beam to form the structured light pattern based in part on the emission instructions. The projection assembly is configured to project the one or more structured light patterns into the local area. The imaging device of the DCA 620 is configured to capture portions of the one or more structured light patterns scattered from one or more objects in the local area. The controller of the DCA 620 generates the emission instructions and provides the emission instructions to the light generator. The controller is also configured to determine depth information for the one or more objects based on information of the captured portions of the one or more scattered structured light patterns. The DCA 620 is an embodiment of the DCA 220 in FIG. 2 or the DCA 300 in FIG. 3.

The electronic display 625 displays 2D or 3D images to the user in accordance with data received from the console 610. In various embodiments, the electronic display 625 comprises a single electronic display or multiple electronic displays (e.g., a display for each eye of a user). Examples of the electronic display 625 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof.

The optical assembly 630 magnifies image light received from the electronic display 625, corrects optical errors associated with the image light, and presents the corrected image light to a user of the HMD 605. The optical assembly 630 includes a plurality of optical elements. Example optical elements included in the optical assembly 630 include: an aperture, a Fresnel lens, a convex lens, a concave lens, a filter, a reflecting surface, or any other suitable optical element that affects image light. Moreover, the optical assembly 630 may include combinations of different optical elements. In some embodiments, one or more of the optical elements in the optical assembly 630 may have one or more coatings, such as partially reflective or anti-reflective coatings.

Magnification and focusing of the image light by the optical assembly 630 allows the electronic display 625 to be physically smaller, weigh less and consume less power than larger displays. Additionally, magnification may increase the field of view of the content presented by the electronic display 625. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optical assembly 630 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 625 for display is pre-distorted, and the optical assembly 630 corrects the distortion when it receives image light from the electronic display 625 generated based on the content.

The IMU 640 is an electronic device that generates data indicating a position of the HMD 505 based on measurement signals received from one or more of the position sensors 635 and from depth information received from the DCA 620. A position sensor 635 generates one or more measurement signals in response to motion of the HMD 605. Examples of position sensors 635 include: one or more accelerometers, one or more gyroscopes, one or more magnetometers, another suitable type of sensor that detects motion, a type of sensor used for error correction of the IMU 640, or some combination thereof. The position sensors 635 may be located external to the IMU 640, internal to the IMU 640, or some combination thereof.

Based on the one or more measurement signals from one or more position sensors 635, the IMU 640 generates data indicating an estimated current position of the HMD 605 relative to an initial position of the HMD 605. For example, the position sensors 635 include multiple accelerometers to measure translational motion (forward/back, up/down, left/right) and multiple gyroscopes to measure rotational motion (e.g., pitch, yaw, roll). In some embodiments, the IMU 640 rapidly samples the measurement signals and calculates the estimated current position of the HMD 605 from the sampled data. For example, the IMU 640 integrates the measurement signals received from the accelerometers over time to estimate a velocity vector and integrates the velocity vector over time to determine an estimated current position of a reference point on the HMD 605. Alternatively, the IMU 640 provides the sampled measurement signals to the console 610, which interprets the data to reduce error. The reference point is a point that may be used to describe the position of the HMD 505. The reference point may generally be defined as a point in space or a position related to the HMD's 605 orientation and position.

The IMU 640 receives one or more parameters from the console 610. The one or more parameters are used to maintain tracking of the HMD 605. Based on a received parameter, the IMU 640 may adjust one or more IMU parameters (e.g., sample rate). In some embodiments, certain parameters cause the IMU 640 to update an initial position of the reference point so it corresponds to a next position of the reference point. Updating the initial position of the reference point as the next calibrated position of the reference point helps reduce accumulated error associated with the current position estimated the IMU 640. The accumulated error, also referred to as drift error, causes the estimated position of the reference point to "drift" away from the actual position of the reference point over time. In some embodiments of the HMD 605, the IMU 640 may be a dedicated hardware component. In other embodiments, the IMU 640 may be a software component implemented in one or more processors.

In some embodiments, the eye tracking system 645 is integrated into the HMD 605. The eye tracking system 645 determines eye tracking information associated with an eye of a user wearing the HMD 605. The eye tracking information determined by the eye tracking system 645 may comprise information about an orientation of the user's eye, i.e., information about an angle of an eye-gaze. In some embodiments, the eye tracking system 645 is integrated into the optical assembly 630. An embodiment of the eye-tracking system 645 may comprise an illumination source and an imaging device (camera).

In some embodiments, the varifocal module 650 is further integrated into the HMD 505. The varifocal module 650 may be coupled to the eye tracking system 645 to obtain eye tracking information determined by the eye tracking system 645. The varifocal module 650 may be configured to adjust focus of one or more images displayed on the electronic display 625, based on the determined eye tracking information obtained from the eye tracking system 645. In this way, the varifocal module 650 can mitigate vergence-accommodation conflict in relation to image light. The varifocal module 650 can be interfaced (e.g., either mechanically or electrically) with at least one of the electronic display 625 and at least one optical element of the optical assembly 530. Then, the varifocal module 650 may be configured to adjust focus of the one or more images displayed on the electronic display 625 by adjusting position of at least one of the electronic display 625 and the at least one optical element of the optical assembly 630, based on the determined eye tracking information obtained from the eye tracking system 645. By adjusting the position, the varifocal module 650 varies focus of image light output from the electronic display 625 towards the user's eye. The varifocal module 650 may be also configured to adjust resolution of the images displayed on the electronic display 625 by performing foveated rendering of the displayed images, based at least in part on the determined eye tracking information obtained from the eye tracking system 645. In this case, the varifocal module 650 provides appropriate image signals to the electronic display 625. The varifocal module 650 provides image signals with a maximum pixel density for the electronic display 625 only in a foveal region of the user's eye-gaze, while providing image signals with lower pixel densities in other regions of the electronic display 625. In one embodiment, the varifocal module 650 may utilize the depth information obtained by the DCA 620 to, e.g., generate content for presentation on the electronic display 625.

The I/O interface 615 is a device that allows a user to send action requests and receive responses from the console 610. An action request is a request to perform a particular action. For example, an action request may be an instruction to start or end capture of image or video data or an instruction to perform a particular action within an application. The I/O interface 615 may include one or more input devices. Example input devices include: a keyboard, a mouse, a game controller, or any other suitable device for receiving action requests and communicating the action requests to the console 610. An action request received by the I/O interface 615 is communicated to the console 610, which performs an action corresponding to the action request. In some embodiments, the I/O interface 615 includes an IMU 540 that captures calibration data indicating an estimated position of the I/O interface 615 relative to an initial position of the I/O interface 615. In some embodiments, the I/O interface 615 may provide haptic feedback to the user in accordance with instructions received from the console 610. For example, haptic feedback is provided when an action request is received, or the console 610 communicates instructions to the I/O interface 615 causing the I/O interface 615 to generate haptic feedback when the console 610 performs an action.

The console 610 provides content to the HMD 605 for processing in accordance with information received from one or more of: the DCA 620, the HMD 605, and the I/O interface 615. In the example shown in FIG. 6, the console 610 includes an application store 655, a tracking module 660, and an engine 665. Some embodiments of the console 610 have different modules or components than those described in conjunction with FIG. 6. Similarly, the functions further described below may be distributed among components of the console 610 in a different manner than described in conjunction with FIG. 6.

The application store 655 stores one or more applications for execution by the console 610. An application is a group of instructions, that when executed by a processor, generates content for presentation to the user. Content generated by an application may be in response to inputs received from the user via movement of the HMD 605 or the I/O interface 615. Examples of applications include: gaming applications, conferencing applications, video playback applications, or other suitable applications.

The tracking module 660 calibrates the HMD system 600 using one or more calibration parameters and may adjust one or more calibration parameters to reduce error in determination of the position of the HMD 605 or of the I/O interface 615. For example, the tracking module 660 communicates a calibration parameter to the DCA 620 to adjust the focus of the DCA 620 to more accurately determine positions of structured light elements captured by the DCA 620. Calibration performed by the tracking module 660 also accounts for information received from the IMU 640 in the HMD 605 and/or an IMU 640 included in the I/O interface 615. Additionally, if tracking of the HMD 605 is lost (e.g., the DCA 620 loses line of sight of at least a threshold number of structured light elements), the tracking module 660 may re-calibrate some or all of the HMD system 600.

The tracking module 660 tracks movements of the HMD 605 or of the I/O interface 615 using information from the DCA 620, the one or more position sensors 635, the IMU 640 or some combination thereof. For example, the tracking module 650 determines a position of a reference point of the HMD 605 in a mapping of a local area based on information from the HMD 605. The tracking module 660 may also determine positions of the reference point of the HMD 605 or a reference point of the I/O interface 615 using data indicating a position of the HMD 605 from the IMU 640 or using data indicating a position of the I/O interface 615 from an IMU 640 included in the I/O interface 615, respectively. Additionally, in some embodiments, the tracking module 660 may use portions of data indicating a position or the HMD 605 from the IMU 640 as well as representations of the local area from the DCA 620 to predict a future location of the HMD 605. The tracking module 660 provides the estimated or predicted future position of the HMD 605 or the I/O interface 615 to the engine 655.

The engine 665 generates a 3D mapping of the area surrounding some or all of the HMD 605 (i.e., the "local area") based on information received from the HMD 605. In some embodiments, the engine 665 determines depth information for the 3D mapping of the local area based on information received from the DCA 620 that is relevant for techniques used in computing depth. The engine 665 may calculate depth information using one or more techniques in computing depth from one or more structured light patterns. In various embodiments, the engine 665 uses the depth information to, e.g., update a model of the local area, and generate content based in part on the updated model.

The engine 665 also executes applications within the HMD system 600 and receives position information, acceleration information, velocity information, predicted future positions, or some combination thereof, of the HMD 605 from the tracking module 660. Based on the received information, the engine 665 determines content to provide to the HMD 605 for presentation to the user. For example, if the received information indicates that the user has looked to the left, the engine 665 generates content for the HMD 605 that mirrors the user's movement in a virtual environment or in an environment augmenting the local area with additional content. Additionally, the engine 665 performs an action within an application executing on the console 610 in response to an action request received from the I/O interface 615 and provides feedback to the user that the action was performed. The provided feedback may be visual or audible feedback via the HMD 605 or haptic feedback via the I/O interface 615.

In some embodiments, based on the eye tracking information (e.g., orientation of the user's eye) received from the eye tracking system 645, the engine 665 determines resolution of the content provided to the HMD 605 for presentation to the user on the electronic display 625. The engine 665 provides the content to the HMD 605 having a maximum pixel resolution on the electronic display 625 in a foveal region of the user's gaze, whereas the engine 665 provides a lower pixel resolution in other regions of the electronic display 625, thus achieving less power consumption at the HMD 605 and saving computing cycles of the console 610 without compromising a visual experience of the user. In some embodiments, the engine 665 can further use the eye tracking information to adjust where objects are displayed on the electronic display 625 to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth camera assembly (DCA) comprising:
a structured light generator configured to illuminate a local area with structured light in accordance with emission instructions, the structured light generator comprising:
an illumination source configured to emit an optical beam,
a thin film acousto-optic device that generates a structured light pattern from the optical beam, the acousto-optic device is configured to function as a dynamic diffraction grating that diffracts the optical beam to form the structured light pattern, and parameters of the dynamic diffraction grating are based in part on the emission instructions, and
a projection assembly that projects the structured light pattern into the local area;
an imaging device configured to capture one or more images of the local area into which the structured light pattern is projected; and
a controller configured to:
generate the emission instructions;
provide the emission instructions to the structured light generator, and
determine depth information for an object in the local area using the captured one or more images.

2. The DCA of claim 1, wherein the controller is configured to create emission instructions which include a radio frequency at which the acousto-optic device is driven.

3. The DCA of claim 2, wherein the acousto-optic device includes a transducer and a diffraction area and responsive to the radio frequency in the emission instructions, the transducer is configured to generate a sound wave in the diffraction area to form the dynamic grating.

4. The DCA of claim 2, wherein the parameters include a diffraction angle at which the structured light is projected into the local area, and the controller is configured to modify the radio frequency to adjust the diffraction angle.

5. The DCA of claim 1, wherein the dynamic grating is configured to function as a grating with a type selected from a group consisting of a reflective grating and a transmissive grating.

6. The DCA of claim 1, wherein the optical beam has an initial state of polarization determined by the properties of the acousto-optic device.

7. The DCA of claim 1, wherein the optical beam emitted by the illumination source and incident upon the acousto-optic device satisfies a Bragg phase matching condition.

8. The DCA of claim 1, wherein the optical beam is configured to emit light in a band ranging from the visible to infrared, and wherein the acousto-optic device is transmissive over the band.

9. The DCA of claim 8, wherein a majority of optical power of the structured light pattern is in a positive first order diffracted beam and a negative first order diffracted beam for an interferometric mode of operation.

10. The DCA of claim 1, wherein the acousto-optic element includes a transducer array structure comprising multiple individual transducer elements and multiple individual diffraction areas.

11. The DCA of claim 10, wherein the illumination source is selected from a group consisting of a pulse laser and a continuous wave laser.

12. The DCA of claim 1, further comprising:
a beam conditioning assembly that couples light from the illumination source to the acousto-optic device, the beam conditioning assembly including an optical element selected from a group consisting of: a single lens, and a microlens array that couples the optical beam to the acousto-optic device.

13. The DCA of claim 1, wherein a majority of optical power of the structured light pattern is in a first order diffracted beam for a laser scanning mode of operation.

14. The DCA of claim 1, wherein the controller is configured to create emission instructions which include a radio frequency at which the acousto-optic device is driven, and the structured light or scanning pattern is based in part on the radio frequency.

15. The DCA of claim 14, wherein the acousto-optic device comprises a transducer and a diffraction area and responsive to the radio frequency in the emission instructions, the transducer is configured to generate a sound wave in the diffraction area to form the dynamic grating.

16. The DCA of claim 13, wherein the parameters include a diffraction angle at which the structured light is projected into the local area, and the controller is configured to modify the radio frequency to adjust the diffraction angle.

17. The DCA of claim 13, further comprising:
a beam conditioning assembly that couples light from the illumination source to the acousto-optic device, the beam conditioning assembly including a microlens array that couples the optical beam to the acousto-optic device.

18. The DCA of claim 13, wherein the acousto-optic element includes a transducer array structure comprising multiple individual transducer elements and multiple individual diffraction areas.

19. The DCA of claim 13, wherein the illumination source is selected from a group consisting of a pulse laser and a continuous wave laser.

20. The DCA of claim 1, wherein the acousto-optic element diffracts multiple optical beams from the illumination source and spatially scans the local area.

* * * * *